May 10, 1966     E. A. LINK     3,250,869
INSPECTION DEVICE FOR FLUID FILLED ELECTRICAL APPARATUS
Filed April 5, 1962
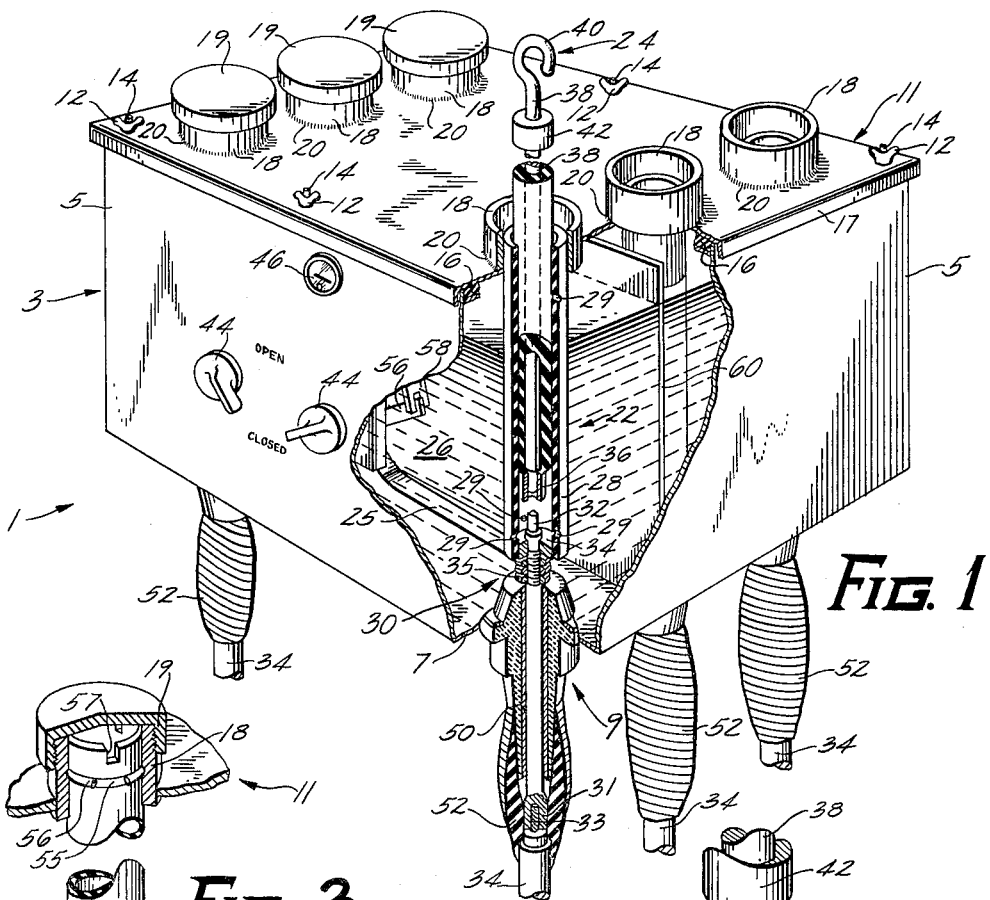
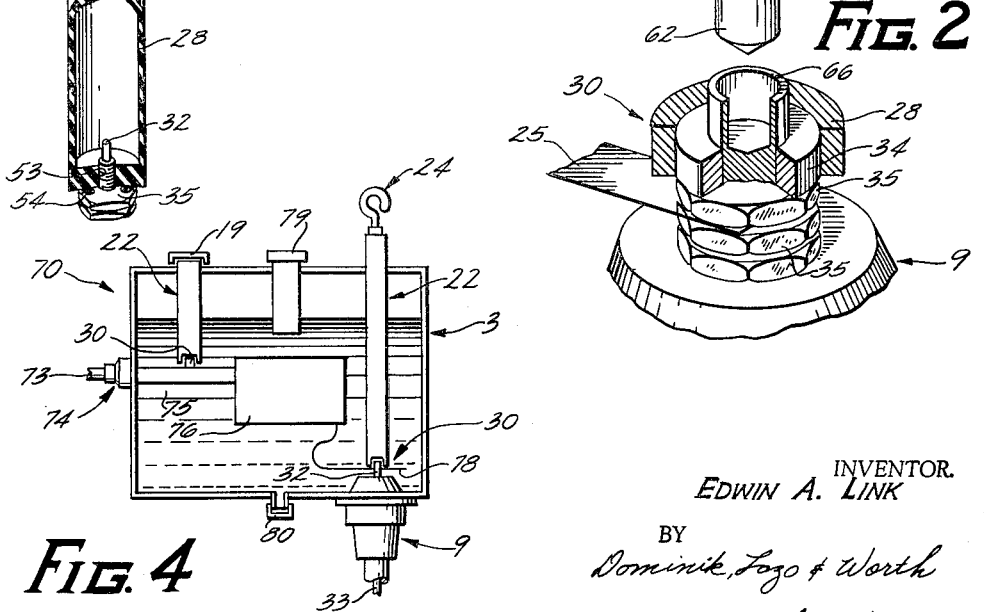
INVENTOR.
EDWIN A. LINK
BY Dominik, Lozo & Worth
ATTORNEYS United States Patent Office 3,250,869
Patented May 10, 1966

3,250,869
INSPECTION DEVICE FOR FLUID FILLED
ELECTRICAL APPARATUS
Edwin A. Link, Waukesha, Wis., assignor to RT & E
Corporation, Waukesha, Wis.
Filed Apr. 5, 1962, Ser. No. 185,276
3 Claims. (Cl. 200—51)

This invention relates to a fluid filled electrical apparatus and more particularly to means for inspecting a conductor inaccessibly disposed within such apparatus to determine the electrical state of such conductor. The invention relates in one aspect to inspection means for electrical apparatus filled with a dielectric insulating liquid in which the conductor to be inspected is immersed. Another aspect of the invention relates to encased gas filled electrical apparatus having a means for inspecting a conductor which is located within the casing immersed in the gas.

One outstanding use for an apparatus constructed in accordance with the invention is in underground components of, or ground level mounted components of, underground power distribution systems carrying, for example, voltages upwards of 2,200 volts. Power distribution systems vary widely in the magnitude of voltages involved, and apparatus of the present character is also adaptable for the handling of lower voltages, where the same is desired. The present invention is also advantageously used in components of above-ground power distribution systems.

The invention is applicable in a wide variety of electrical equipment, for example, transformers, disconnect means such as fuses and circuit breakers, junction boxes, certain types of cable terminations and switches. For convenience the invention will be described chiefly with relation to an oil filled electric switch for high voltage application, it being understood that the invention is applicable as well to other forms of electrical apparatus.

In the servicing of power distribution systems, it is frequently necessary to turn off the electricity traveling through a cable in order to work on the cable. Although switches are provided for making and breaking the necessary contacts toward this end, considerable safety hazards are present. In the ordinary type of switch gear one cannot tell by visual inspection alone whether a cable or a switch is conducting electricity (i.e. is "live") or not. As a matter of good practice the operator servicing such equipment always assumes that the cables concerned are live until appropriate tests have established otherwise. The test procedures vary according to the type of switch and can involve establishing electrical contact with a cable, testing it to see if it is hot or live, manipulating switches to achieve the desired condition of the cable, grounding the cable, and such other steps as may be indicated by the particular apparatus. Thus one design criterion for satisfactory switches is the accessibility of selected portions thereof, especially cable terminations, for testing the same in the safest fashion.

In fluid filled apparatus, particularly liquid (oil) filled switches having the switch gear, cable terminals, and conductors immersed in a body of oil, considerable problems have arisen in conjunction with servicing because of the inaccessible character of the terminals and conductors, as well as the difficulty of seeing the terminal involved and the switch to which it may be connected. Some prior art apparatus has included windows or the like as a means for visually inspecting the terminals and such electrical junctions as may be made with them by switches during the course of testing and servicing. The window technique is not satisfactory because the oil covering the parts of interest does not always remain transparent becoming darker with age and with repeated arcings, for example. Other systems have been devised involving relatively complex interlocking means to insure that the operator has to go through a certain sequence of operations in order to establish the particular cable or cable termination in a desired electrical state.

Gas filled apparatus presents fewer problems as to visibility but does ordinarily present exposed conductors upon opening the casing.

The advent of underground distribution systems has led to the positioning of transformers and switch gear at the ground level. Prior art switch gear practices, having been shaped heavily in the United States by almost unanimous use of above-ground power distribution systems, are not entirely satisfactory for this ground level equipment. One major reason for this is the safety of the general public who may be exposed to this equipment. Children are likely to play in or upon the apparatus and otherwise attempt to tinker with it. The switch gear, and other apparatus too, must therefore be securely encased in such fashion that no conductors are exposed outside the casing and that access to various conductors of interest for servicing is maintained while at the same time rendering the switch gear tamper-proof to avoid exposure of the public and the operator to what could easily be a fatal accident.

It is an object of the present invention to provide an electrical apparatus which allows a simple and safe procedure to determine if a given conductor is at the time conducting electricity.

Another object of the invention is the provision of an oil filled electrical apparatus suitable for mounting at ground level.

The present invention features an electrical apparatus having a casing and an electrical conductor (such as cable terminations, terminals, switch contacts and contact arms, bus bars and the like—herein generically denoted as conductors) disposed within the casing. Within the casing is provided a guide means for establishing a probe guide path extending from a probe engaging means on the conductor to outside the casing. A probe engaging means is provided upon the conductor at one end of the probe guide path to maintain a probe passed through the guide means in conducting contact with the conductor.

The casing is adapted to contain a body of suitable fluid in which all or selected parts of the apparatus may be immersed. The body of fluid may be a gas or liquid and is advantageously an insulating liquid such as transformer oil or the like.

An operator desiring to determine the electrical state of the predetermined conductor may then insert an electrically conductive probe through the guide means in such fashion as to establish contact via the connector means with the conductor. Thereafter the operator goes through an appropriate test procedure, grounds the probe, and can proceed to work on the conductor or a cable to which it is attached once it is determined that the conductor is no longer alive.

That portion of the guide means outside the casing is preferably located in a position geographically similar to the conductor to which it relates whereby the operator can, by such similarity, determine if he is probing the proper conductor. This is especially advantageous where a plurality of conductors produce an array of guide means.

A number of advantages are thus realized in terms of increased safety of ground level equipment to the operator and the public and also in alleviation of the problems of oil transparency in liquid filled apparatus and of exposed conductors in gas filled apparatus.

Another object is provision of an electrical apparatus having a conductor inaccessibly disposed within a casing that includes a restricted access means permitting inspection of the electrical state of the conductor.

An object of the invention is to provide an electrical apparatus suitable for incorporation into underground electrical distribution systems.

Other objects, advantages and features will become apparent from a reading of the following disclosure in conjunction with the annexed drawings wherein:

FIG. 1 is a partially cutaway front elevation assembly view of an oil filled switch having one probe entrance cap removed and a probe in place.

FIG. 2 is a partial front elevation view as seen in FIG. 1 which represents a male probe connector suitable for joining with a female connection.

FIG. 3 is a partial cross sectional view of a gas filled switch, otherwise like that of FIG. 1, having a substantially fluid-tight means for inspecting.

FIG. 4 is a cross sectional view through a typical electrical apparatus having oil changing means as well as means for inspecting, showing by way of example an electrical probe in place as it would be during testing.

Throughout the drawings the same reference numerals refer to the same parts.

Referring first to FIG. 1 there is shown by way of example an oil filled electrical switch assembly 1 that has a means for inspecting a terminal included in the structure thereof. The switch assembly includes a hollow switch casing assembly 3 having a generally rectangular cross section as seen in both plan and elevation. As shown, the casing assembly comprises a plurality of vertically arranged walls generically designated 5 which are mutually joined at their lower edges by a casing bottom 7 through which latter is led at least one electrical bushing assembly 9.

A lid assembly 11 is removably secured to the remainder of the casing assembly by any suitable means, a plurality of thumb screws 12 being illustrated. The thumb screws threadedly engage studs 14 which extend vertically from the upper edge of the casing sides 5, and a gasket 16 is provided to seal between the bottom side of the lid panel and the upper edges of the sides 5. The lid assembly preferably has a flange 17 extending therearound to facilitate seating.

The lid assembly further includes a plurality of probe entrance sleeves 18 sealably secured thereto in any suitable fashion, for example, by a continuous weld 20 extending peripherally around the entrance sleeve and joining the same to the lid. Each probe entrance sleeve is fitted with a removable cap 19, or other means removably secured to the lid outside the casing for selectively blocking and sealing the access to the guide means assembly 22, next described. It will be appreciated that only a portion of the caps are shown in place whereby to illustrate appropriate parts of the assembly with and without the blocking means or caps.

The probe guide means assembly is for establishing a guide path for the probe assembly 24 from an electrical conductor 25, through a body of insulating fluid such as the oil 26 to outside the casing via the probe entrance sleeve 18. The guide means 22 includes a probe guide tube 28 of dielectric insulating material which extends from a probe engaging means on the conductor through the oil or other insulating fluid and at least partially into the entrance sleeve 18. A plurality of ports 29 are provided in the guide tube to establish complete communication with the insulating fluid within the casing. A number of the ports are provided both above and below the level of any insulating liquid such as the oil 26. The guide tube may, if desired, be manufactured of wood, Bakelite, or other materials considered to have appropriate insulating and dielectric properties. The tube 28 does not have to comprise an actual annular member but may include a plurality of vertically extending struts defining a passage for the probe assembly 24.

At the bottom of the probe guide tube 28 is a probe engaging means 30 which is secured preferably to a terminal to which the conductor 25 is connected. The probe engaging means 30 receives the probe assembly 24, matingly engages the assembly 24, and serves to maintain the probe assembly 24 in appropriate electrical contact with the conductor of interest, here the conductor 25. The probe engaging means 30 is illustrated to be a portion of the terminal connection.

A male probe connector (that is, probe engaging means) 30 is shown and includes a cable termination stud 32 which is connected at its lower end to the cable 33 by some appropriate means such as the stud sleeve 31. The bushing assembly 9 brings the stud through the casing bottom. Bushing assemblies are well known in the art and are described further only to the extent required by the stud structure. The cable 33 is ordinarily surrounded by appropriate electrical insulation 34.

The stud 32 is so made as to constitute a single conductor, i.e. it is electrically integral and preferably is made of a single piece of material such as copper whereby the stud is integral structurally as well as electrically. The advantage of the integral construction is that the stud is a unitary conductor provided between the cable 33 and the conductor 25, hence there are no means interposed between the conductor of interest and the inspection and testing means. A direct connection is establishable, using the probe 24, from the conductor of interest to a point outside the casing 3.

The stud 32 is preferably cemented along its intermediate portion into the bushing assembly 9 by an appropriate sealing cement 50. Insulating tape 52 covers the stud sleeve to cable connections.

At the upper end of the stud 32 of FIG. 1, one or more nuts 35 threadedly engage the stud and secure the conductor 25 thereto in electrical contact with the stud as well as with the cable 33. An annular disc 34 connects the lower end of the guide tube to the cable termination stud 32. The disc may if desired be formed integrally with the guide tube 28 or may be permanently secured thereto in any appropriate fashion as by an appropriate cementing material or a force fit. The stud, it will be noticed, extends above the disc 34 whereby it can engage a mating part on the probe assembly 24.

The probe assembly 24 includes means for matingly engaging the probe connector 30, including a female conducting sleeve 36 for snugly fitting in electrical conducting relationship with that portion of the stud 32 extending above the disc. If desired, holes are drilled in the sleeve, or a slot is provided lengthwise of the sleeve 36 whereby oil or other fluid is forced out of it as the stud enters the female portion. Conversely, the stud may have one or more longitudinal grooves or slots to the same end. The remainder of the probe assembly includes a conducting bar 38, advantageously formed of copper with a hot line stick engaging handle 40 at the upper end thereof. The handle 40 is of copper, whereby ground leads can be readily attached thereto in the course of testing and so forth. The copper bar 38 is covered throughout its intermediate portion with a body of insulating medium 42 such as Bakelite, hard rubber or the like. The conducting sleeve 36 is maintained in electrical contact with the lower end of the probe bar 38.

Other portions of the electric switch assembly shown in FIG. 1 include a plurality of switch operating handles 44, an oil level gauge 46, and indicia to indicate the condition of the switch. The switches may be of any conventional variety and can each include a switch shaft extending through a gland in the side 5 of the casing. The illustrated embodiment shows ganged switches.

Enclosed within the casing and immersed in the body of oil are the probe engaging means 30 as well as the conductor 25 and the various electrical operating gear such as the switch blade 56 and bus bar 58. In the embodiment shown, turning the handle 44 clockwise opens the connection between the bus bar and the conductor 25 which is otherwise established by the switch blade 56. The bus bar can extend over to another switch, thence to another cable termination constructed in like fashion including the probe guide means, as described above.

FIG. 3 represents an embodiment that is substantially gas-tight which is useful in gas-filled apparatus. Assuming a switch, casing and probe substantially as in FIG. 1, the gas-tight embodiment includes a probe guide tube 28 having a centrally located threaded hole 53 at its lower end, which engages mating threads on the stud 32. A suitable lower gasket 54 of resilient material is compressed between the tube lower end and a nut 35. A groove 55 in the upper end of the guide tube supports an upper gasket means such as O ring 56 in compression against the inner wall of the sleeve 18. The upper end of the guide tube is advantageously diametrically slotted as at 57 whereby a bar can be inserted in the slots to screw the tube down by threads 53 thus to establish seals at the gaskets 54, 56.

The sleeve 28 in the FIG. 3 embodiment is impermeable and has no holes 29. Impermeability is enhanced by coating the outside of the sleeve with a homogeneous continuous coating of a suitable resin such as natural or synthetic rubber, nylon, Teflon or the like.

Switches or other apparatus such as a plurality of transformer phases or the like are all immersed in the body of insulating fluid and where oil is used are beneath the liquid level of the oil. Furthermore, individual switches are preferably isolated from each other by means of insulating cardboard 60 which may be arranged in any suitable fashion. In the embodiment shown, where six individual probe entrance sleeves are provided, it would be preferred to have six different compartments which are advantageously formed by providing an egg crate arrangement of the insulating cardboard 60 to isolate each switch compartment and its probe guide means from each other switch compartment.

In cases where the insulating medium is a gas such as air or the like, the insulating cardboard would preferably be provided in all cases in order to enhance the dielectric and insulating properties of the entire assembly.

A variety of probe connecting means may be provided. A male terminal to female probe has been described above. In similar fashion a male probe and female terminal connection may be provided as is shown in FIG. 2 where the conductor 25 is disposed as in FIG. 1 between two nuts 35 in electrical contact with the cable termination sleeve 66. The central portion of the sleeve is of a size and shape to receive the male stud 62 which comprises the shaped lower end of the probe conducting bar 38. The sleeve 66 is advantageously a part of the cable termination and extends through the bushing assembly 9 into electrical engagement with a cable or the like as described above. The connection between the sleeve 66 and the guide tube 28 still advantageously comprises the disc member 34 above which the sleeve preferably extends.

Due to the character of the voltages handled in equipment of the type described, all of the insulation is selected for what is considered by the art as high voltage or high tension applications.

The invention is applicable to a wide variety of electrical equipment and in a variety of ways as further illustrated in FIG. 4. A fluid filled electrical apparatus 70 is shown in FIG. 4 as having a hollow casing 3, similar reference numbers being used as above for the sake of convenience. Power is led through the casing by means of a bushing and appropriate sealing means generically designated 74 which establishes a connection between the cable 73 and the conductor 75 inside the casing. Also inside the casing is an electrical apparatus 76 which may be of any type of electrical apparatus and may include not only a switch as represented in FIG. 1 but also, for example, a transformer, a disconnect means such as a fuse or fuses, or a circuit breaker, may constitute a junction box, or may even be certain special types of cable terminations and associated equipment. The conductor 75 has secured at an appropriate place thereon a probe engaging means 30 extending upwardly from which is a probe guide means assembly 22. An appropriate removable sealing means such as cap 19 seals off the upper end of the guide means.

The guide tube 28 can be secured to the stud 32, 66 in the embodiments of FIGS. 1, 2, 3 by threads (as in FIG. 3) or a force fit (as in FIGS. 1, 2). Also a locknut can be provided on top of tube end 34 to engage stud 32, 66 and leaving a portion of the stud available for engagement by the probe.

On the other side of the apparatus 76 is another conductor 78 on which is mounted a suitable type of probe connector or probe engaging means 30. Again, extending upwardly from 30 through the casing, is a probe guide means assembly 22. In the embodiment illustrated, the cap has been removed from the assembly 22 and a probe assembly 24 has been inserted for the purpose of making appropriate tests. The conductor 78 is attached to a suitable cable termination 32 which establishes contact within the bushing and sealing means 9 with the cable 33.

The embodiment shown in the drawings includes a straight tubular member 28 as a portion of the probe guide means. The invention also comprehends a curvilinear probe guide means advantageously comprising an arc of a circle. In such case, of course, the probe is of a similar arc and radius whereby it is readily inserted through the guide tube into connection with the probe connector 30. An advantage of the curved arrangement is the elimination of a straight line passage out of the casing whereby radiation effects such as from nuclear fission and the like have a more tortuous path to travel.

The operation is considered to be evident from the foregoing but for convenience will be reviewed, giving a typical example of the manner in which the electrical apparatus 1, 70 has a conductor therein selectively tested in order to establish the electrical nature of such conductor.

The operator, in beginning his tests, first establishes that the casing assembly 3 is not conducting, is properly grounded, and is otherwise safe to contact. The cap 19 or other blocking means is then removed, using appropriate tools such as a pipe wrench, or a special wrench mounted on a hot line stick for removing the same. Once the cap is removed, the operator visually inspects the condition of the switch 44 or any other means which might give an indication of the electrical status of the conductor of interest. For the present example, it is assumed that the conductor 33 is the one to be tested to the end that work may be done either on cable 33 or some apparatus with which it is associated. There may on some occasions not be any visual indicating means in which case the operator then proceeds to the next step without such visual inspection. The probe is inserted into the probe guide means assembly using a hot line stick or other appropriate tool. The probe is inserted and hard enough to electrically and mechanically engage the probe connecting means 30. A test is then run on the exposed handle 40 of the probe to establish its electrical nature. A convenient testing means would comprise bringing a statiscope adjacent the exposed probe handle 40. If the conductor of interest—here the cable 33 or the conductor 25—is found to be live, appropriate switches either in the unit itself or elsewhere in the electrical system are thrown until this test illustrates the conductor or cable of interest to no longer be conducting. A further test, again advantageously using the statiscope, is run. Once it is established that no electricity is being conducted, a hot line stick is used to establish a connection to ground from the exposed portion of the probe handle 40. This is accomplished in any convenient fashion and may comprehend using well known electrical connecting means as ground connections.

Now that the conductor of interest is known to be dead, other parts of the system which are to be worked on are tested in a similar fashion, or whatever fashion is suitable considering the nature of the equipment. Once the specific apparatus or part of the system to be repaired or serviced is in a safe state with no electricity passing thereto or therefrom, then the operator proceeds to conduct his repair or servicing operation.

Referring to FIG. 4, it will be observed that an oil filling connection 79 and an oil withdrawal connection 80 are respectively provided on the lid and at the bottom of the casing assembly 3. Advantageously these connecttions include pipe caps which are removably secured to a pipe nipple. The filling connection 79 preferably includes a nipple which extends below the normal oil level whereby air or other gas in the casing is not absorbed by the oil during filling. With the pair of connections shown in FIG. 4, it is easy to replace, dry or add oil.

It will be appreciated that the operator is working "blind" because he cannot see the probe-probe engaging means-conductor connection. Where an array of probe engaging means extends to outside the casing, as in FIG. 1, the probe engaging means are each positioned in a location that is geographically similar to that of the conductor of interest. Preferably each probe engaging means is arranged in direct alignment with its corresponding conductor, as for example where the conductor concerned is a cable termination or the like which enters one side of the casing, the guide means is located on the opposite side of the casing side. The geographic similarity facilitates selection of the proper probe guide means. Additionally, indicia of suitable nature may be used for identifying each guide means with its conductor.

On occasion it is advantageous to extend the guide tube 28 well above the casing and to affix the caps 19 directly thereto. The insulating body 42 on the probe can be eliminated in such cases, provided the amount of insulation between the exposed probe handle and the casing suffices to prevent arcing between probe and casing.

The invention comprehends various probe connectors or probe engaging means 30, slip-fit types being shown. Threaded probe engaging means are also contemplated, multiple threads for quick assembly being preferred.

While the invention has been described with respect to certain specific embodiments and representative of examples of operation, it is to be understood that it is not intended to restrict the invention solely to those means described and illustrated, but instead to include within the invention all of those modifications, substitutions of equivalents, changes, reversals of the parts, and other immaterial departures as would be apparent to one skilled in the art in light of the disclosure, objects, advantages and features all in view of the spirit of the invention.

I claim:
1. An oil filled electrical switch, having a means for inspecting a terminal to determine the electrical state thereof that comprises
   a hollow switch casing;
   a body of dielectric insulating oil disposed inside said casing;
   a switch assembly having
      all of its electrical junction establishing means immersed in said oil, and
   having on the outside of said casing, means for selectively changing the position of the junction establishing means;
   cable termination means sealably leading a conductor through the casing to a terminal immersed in said body of oil;
   guide means extending from a point adjacent said terminal, through said body of oil, and through said casing to outside said casing for guiding a probe inserted from outside said casing into electrical contact with said terminal, said probe establishing an electrical circuit separate from the normal current circuits of said switch assembly, said guide means being at least partially filled with said oil; and
   probe engaging means secured to said terminal for matingly engaging the end of a probe thereby to establish an electrical junction.

2. An electrical apparatus enabling the determination of the electrical state of a conductor therein by the use of a probe and comprising
   a hollow casing;
   a body of insulating dielectric fluid disposed inside said casing;
   an electrical conductor disposed within said casing and immersed in said body of fluid;
   probe guide means extending from a point adjacent said conductor through said body of fluid to outside said casing guiding a probe inserted from outside said casing into electrical contact with said conductor,
   said probe establishing an electrical circuit separate from the normal current circuit of said conductor,
   said guide means being at least partially filled with said fluid; and
   probe engaging means connected to said conductor for receiving and electrically engaging a probe that has been completely inserted in said guide means thereby to establish a separate conductive path from said conductor to outside said casing.

3. An encased electrical apparatus having a plurality of means each for inspecting one of a corresponding plurality of conductors to determine the electrical state thereof, that comprises
   a hollow casing;
   a body of dielectric insulating liquid disposed inside said casing;
   a plurality of said conductors immersed in said liquid;
   a plurality of electrical assemblies all immersed in said liquid and connectable to selected ones of said conductors;
   a plurality of terminal means for sealably leading a cable through the casing to a junction with at least one of said conductors immersed in said body of liquid;
   a plurality of guide means, each extending from adjacent said terminal means, through said body of liquid, and through said casing to outside said casing for guiding a probe inserted from outside said casing into electrical contact with said conductors, the probe guide path being at least partially filled with said liquid; and
   probe engaging means secured to each of said conductors for matingly engaging the end of a probe thereby to establish an independent electrical circuit to test said apparatus.

(References on following page)

References Cited by the Examiner

UNITED STATES PATENTS

| | | |
|---|---|---|
| 1,338,180 | 4/1920 | Horton. |
| 1,500,837 | 7/1924 | Moody _____ 174—17 |
| 1,576,102 | 3/1926 | Downes. |
| 1,706,140 | 3/1929 | Brand. |
| 1,769,562 | 7/1930 | Wood _____ 174—17 |
| 2,034,870 | 3/1936 | Judson _____ 174—17 X |
| 2,450,873 | 1/1948 | Anthony ____ 339—117 X |
| 2,516,657 | 7/1950 | Spendlove ___ 339—31 |
| 2,647,939 | 8/1953 | Paluev _____ 174—18 |
| 2,675,528 | 4/1954 | La Point _____ 339—31 |

FOREIGN PATENTS 238,951  8/1925  Great Britain.

ROBERT S. MACON, *Acting Primary Examiner.*

WALTER L. CARLSON, *Examiner.*

E. L. STOLARUN, *Assistant Examiner.*